(12) United States Patent
Ramsden (10) Patent No.: US 7,304,472 B2
(45) Date of Patent: Dec. 4, 2007

(54) ROTARY POSITION SENSOR (75) Inventor: Edward A. Ramsden, Hillsboro, OR (US)

(73) Assignee: Williams Controls Industries, Inc., Portland, OR (US)

(*) Notice: Subject to any disclaimer, the term of this patent is extended or adjusted under 35 U.S.C. 154(b) by 77 days.

(21) Appl. No.: 11/118,303

(22) Filed: Apr. 28, 2005

(65) Prior Publication Data
US 2006/0244441 A1    Nov. 2, 2006

(51) Int. Cl.
G01B 7/30 (2006.01)
(52) U.S. Cl. .............. 324/207.25; 324/207.2
(58) Field of Classification Search ...............
324/207.12–207.25
See application file for complete search history.

(56) References Cited

U.S. PATENT DOCUMENTS

| | | | |
|---|---|---|---|
| 3,184,620 A | | 5/1965 | Leibowitz |
| 3,208,276 A | * | 9/1965 | Wood et al. ............. 73/170.16 |
| 3,286,161 A | * | 11/1966 | Jones et al. ............. 323/353 |
| 3,663,843 A | * | 5/1972 | Smith ..................... 310/10 |
| 4,392,375 A | | 7/1983 | Eguchi |
| 4,570,118 A | * | 2/1986 | Tomczak et al. ......... 324/207.2 |
| 4,922,197 A | * | 5/1990 | Juds et al. ............. 324/207.21 |
| 4,982,155 A | | 1/1991 | Ramsden |
| 5,637,995 A | * | 6/1997 | Izawa et al. ............. 324/174 |
| 5,757,181 A | | 5/1998 | Wolf |
| 5,818,222 A | | 10/1998 | Ramsden |
| 5,818,223 A | | 10/1998 | Wolf |
| 5,861,745 A | * | 1/1999 | Herden .................. 324/207.2 |
| 6,087,951 A | | 7/2000 | Ramsden |
| 6,127,821 A | | 10/2000 | Ramsden |
| 6,201,388 B1 | * | 3/2001 | Pecheny et al. ........ 324/207.2 |
| 6,489,761 B1 | * | 12/2002 | Schroeder et al. ..... 324/207.25 |
| 6,593,734 B1 | * | 7/2003 | Gandel et al. ........ 324/207.25 |
| 6,753,681 B2 | * | 6/2004 | Enomoto et al. ....... 324/207.25 |
| 2003/0020468 A1 | * | 1/2003 | Kato et al. ............ 324/207.25 |
| 2004/0257067 A1 | | 12/2004 | Mattson |

* cited by examiner

Primary Examiner—Jay M Patidar
(74) Attorney, Agent, or Firm—Schwabe, Williamson & Wyatt, P.C.

(57) ABSTRACT

A rotary position sensor is disclosed having a magnetic element having a cavity therein. A flux concentrator is arranged to substantially surround the magnetic element, and a magnetic field sensor located within the cavity. The magnetic element may have rectilinear portions.

22 Claims, 6 Drawing Sheets

ROTARY POSITION SENSOR

TECHNICAL FIELD

Embodiments of the present invention relate generally to the field of position sensors, and more particularly to a position sensor including a magnetic element having a substantially circular aperture and having substantially rectilinear edges.

BACKGROUND

A sensor to indicate movement of an object may be created using the so-called "Hall effect" wherein an electric value in a conductor is changed due to the movement of a proximal magnetic field. For example, U.S. Pat. No. 4,392,375 to Eguchi et al., discloses two spaced apart permanent magnets rotatable about a magnetic sensing element.

U.S. Pat. No. 5,818,223 to Wolf discloses a single rectangular magnet positioned adjacent to and rotatable relative a magnetic sensing element. Bookend-shaped flux concentrators on two sides of the magnetic sensing element are used to concentrate the flux. In an attempt to reduce the axial length of the sensor, in another disclosed embodiment, a ring-shaped magnet is used and a similar arrangement including a sensing element sandwiched between flux concentrators is located within the ring-shaped magnet. The axial positioning of the magnetic sensing element for this device is critical, and steps are taken to try to ensure central location thereof by including a separate nonmagnetically conducting housing with a center locating well to hold the sensor/concentrator arrangement. Proper axial location is further attempted by defining a notch to receive the sensing element at the bottom of the well.

Both described devices have disadvantages including: only one magnetic sensing element may be used; as discussed, the magnetic sensing element must be centrally located; any divergence from the center may affect the accuracy of the sensor; the magnetic elements do not use magnetic material as effectively as the current invention; and reducing the overall size of the disclosed devices is limited.

In the case of the Wolf device, assembly of the sensor may be problematic as proper orientation cannot be assured due to the radial symmetric magnet. Attempts to overcome possible misorientation of the generally circular magnets may include magnetizing the magnetic material to the proper orientation after it has been assembled. This has the disadvantage however in that the magnetic material is predisposed to be oriented to a particular direction. Any variance from the particular direction is less than optimal.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made in alternate embodiments. Therefore, the following detailed description is not to be taken in a limiting sense, and the scope of embodiments in accordance with the present invention is defined by the appended claims and their equivalents.

The following description may include terms such as inner, outer, under, between, upward, downward, outward, inward, top, bottom, above, below, and the like. Such terms are used for descriptive purposes only and are not to be construed as limiting in the description or in the appended claims. That is, these terms are terms that are relative only to a point of reference and are not meant to be interpreted as limitations but are, instead, included in the following description to facilitate understanding of the various aspects of the invention.

Embodiments of the present invention are configured to be relatively sensitive to rotational displacement and very insensitive to radial and axial displacement, and/or may include magnetic sensing elements that are not centrally located. Embodiments may also include more than one magnetic sensing element which may, or may not, be used in designs which call for redundancy or verification. Yet, other embodiments may use multiple magnetic sensing elements at different orientations for various reasons including providing a more linear output.

Embodiments may output an indication of a discrete event such as a device such as a throttle pedal being at particular orientation effected by for example a maximum or a minimum flux incident on a magnetic field sensor arranged at a particular angle. Embodiments of the present invention may output a binary signal, such as a indication of an event, as well as an analog signal indicating a value, for example an amount of rotation. For example, an idle validation switch (IVS) may be arranged to validate a throttle pedal is at, before, or past, a particular point. And an acceleration position sensor (APS) may be arranged to indicate the position of a throttle, pedal indicating an amount the pedal is depressed. The magnetic sensing element, or elements, may be positioned at any particular orientation to signal an event at, for example, a maximum amount of flux sensed. Further, the magnetic sensing elements may be arranged at any angle to increase flux exposure.

Figure 1:
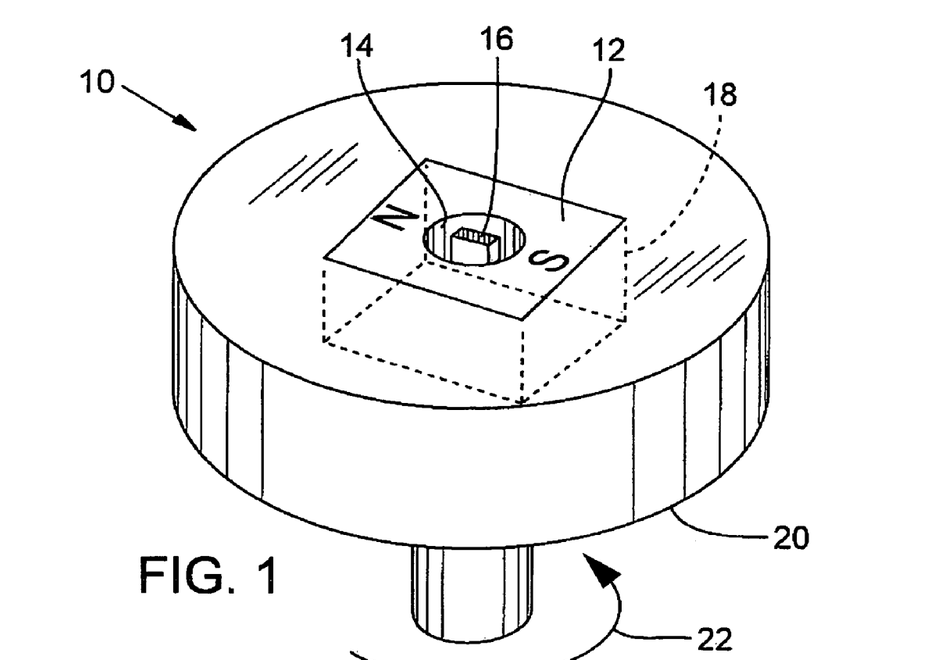
FIG. 1 illustrates a perspective view of a first described embodiment of the present invention.

FIG. 1 illustrates a perspective view of a first described embodiment of the present invention. A rotary position sensor 10 may include a magnetic element 12 having a cavity 14 therein. In this or other embodiments the cavity may or may not pass all the way through the magnetic element. A magnetic field sensor 16 only a portion of which is shown here) may be located within the cavity 14. The magnetic element 12 may be positioned in a hollow 18 defined in a body 20. The body 20 may be adapted to rotate as indicated by arrow 22. The rectilinear shape of the magnetic element 12 and the similarly shaped hollow 18 in the body 20 aid in the assembly of the sensor in that proper orientation of the magnet may be assured. In one embodiment, body 20 may be made of a magnetically permeable material to increase the intensity of a magnetic field inside the cavity 14. For example, the body may be made from a solid piece of metal.

Figure 2A:
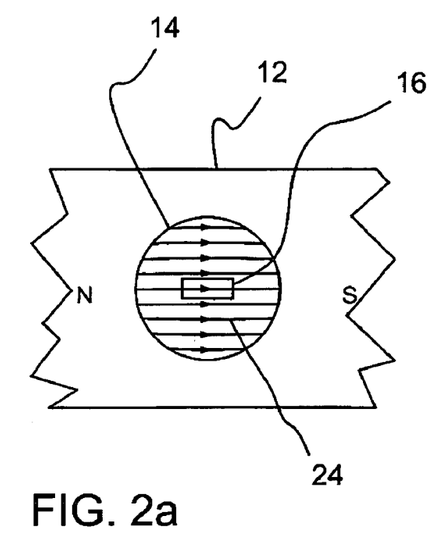
FIG. 2a and FIG. 2b illustrate segments of described embodiments showing two orientations of a magnetic element according to embodiments of the invention.
Figure 2B:
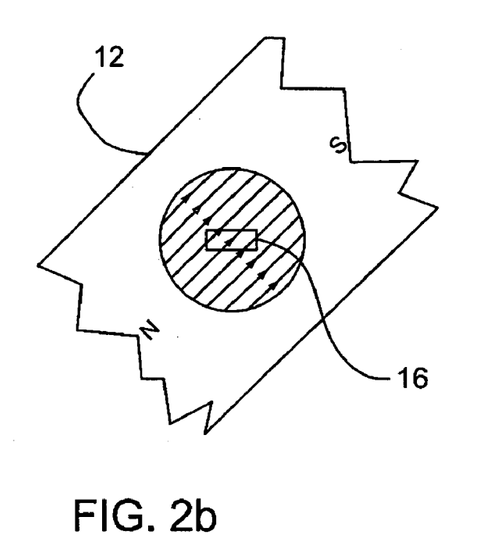

FIGS. 2a and 2b illustrate segmented plan views of possible operations of embodiments of the invention. A uniform magnetic field is represented by substantially parallel lines 24 within a cavity 14 of a magnetic element 12. A magnetic field sensor 16 may be located within the cavity 14 at or near a center thereof. In one embodiment there are no other elements located within the cavity 14 to disturb the uniform magnetic field. Because of the uniformity of the magnetic field, the magnetic field sensor 16 may be located anywhere in the cavity 14, including off-center making assembly easier and reducing costs. The invention may be highly tolerant of both radial and axial displacement of the magnetic field sensor 16 relative to the magnetic element 12.

The sensor 10 may be configured to be coupled to appropriate hardware (not shown) to, for example, output a signal, or effect an action such as provide fuel to an engine based on the position of the magnetic element. In one embodiment, the cavity may be a circular hole or aperture and may be formed in various ways, including drilling or molded into the magnetic element.

Figures 3A, 3B:
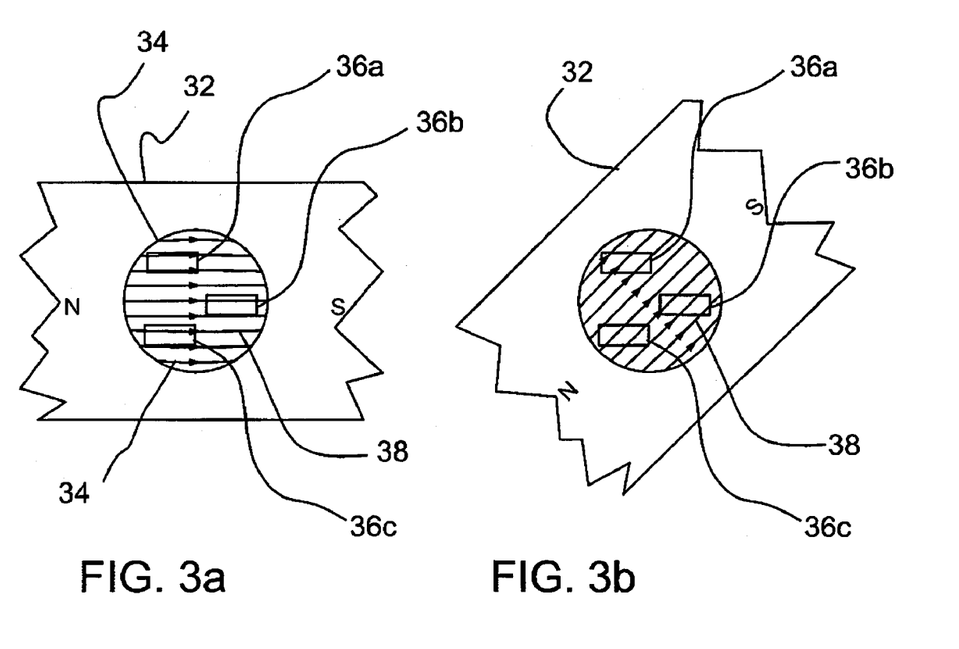
FIG. 3a and FIG. 3b illustrate segments of other described embodiments showing two orientations of a magnetic element according to embodiments of the invention.

FIGS. 3a and 3b illustrate segmented plan views of a possible operation of another embodiment according to the invention. A magnetic element 32 includes a cavity 34 therein. Three magnetic field sensors 36a, 36b, and 36c may be positioned in the cavity 34. A uniform magnetic field may be represented as nearly parallel lines 38. FIG. 3a illustrates the magnetic element 32 in a first orientation. FIG. 3b illustrates the magnetic element 32 in a second orientation. Each of the three magnetic field sensors 36a, 36b, and 36c may be influenced by substantially the same amount of flux change as represented by substantially the same number of lines 38 crossing each of the magnetic field sensors 36a, 36b, and 36c in each respective orientation. Again, in various embodiments of the invention, the number, size, placement, and orientation of the magnetic field sensors may be varied depending on the application.

Figure 4A:
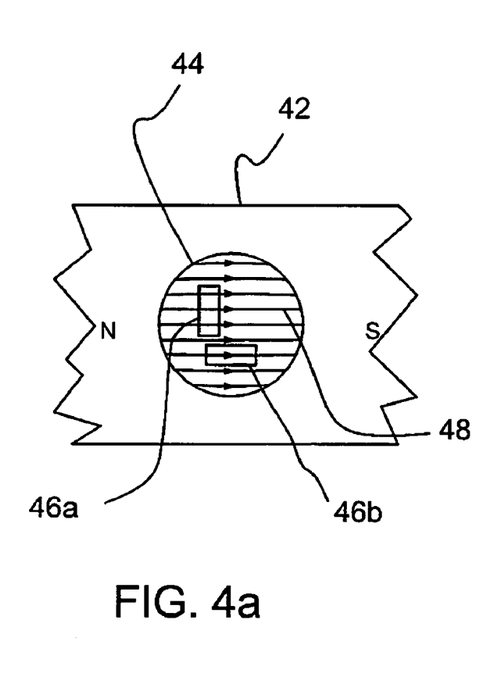
FIG. 4a and FIG. 4b illustrate segments of other described embodiments showing two orientations of a magnetic element according to embodiments of the invention.
Figure 4B:
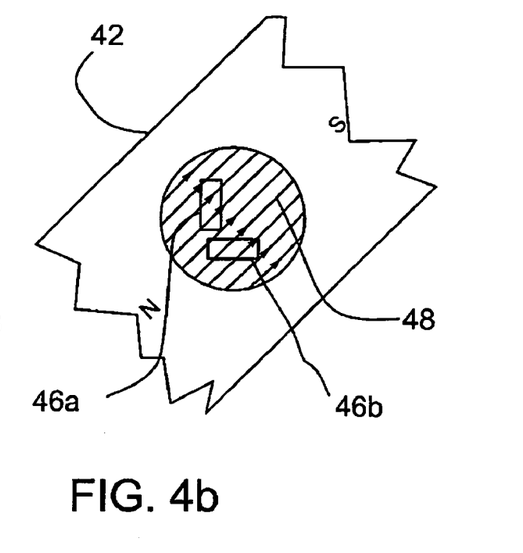

Embodiments of the present invention may include multiple magnetic field sensors at different orientations with respect to each other. FIGS. 4a and 4b illustrate segmented plan views of possible operations of other embodiments according to the invention. A magnetic element 42 includes a cavity 44 therein. First and second magnetic field sensors 46a, and 46b may be positioned in the cavity 44 at different orientations, for example, perpendicular to each other. A uniform magnetic field is represented by lines 48. FIG. 4a illustrates the magnetic element 42 in a first orientation wherein the first magnetic field sensor 46a may be influenced by a maximum amount of magnetic flux as illustrated by the relative greater number of lines 48 crossing the magnetic field sensor 46a. The second magnetic field sensor 46b may be influenced by a minimum amount of flux as illustrated by a smaller number of lines 48 crossing the magnetic field sensor 46b.

On the other hand, FIG. 4b illustrates the magnetic element 42 in a second orientation, for example, 45° wherein both the first magnetic field sensor 46a and the second magnetic field sensor 46b may be influenced by substantially the same amount of flux. As the magnetic element 42 moves from the first orientation to the second orientation, the flux on the first magnetic sensor 46a decreases and the flux on the second magnetic sensor 46b increases.

Figure 5:
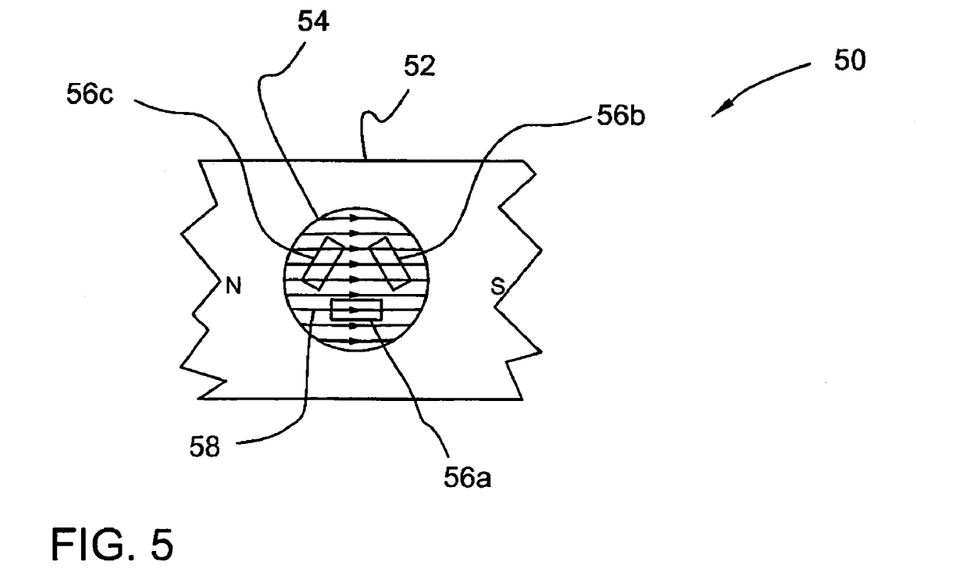
FIG. 5 illustrates segments of describe embodiments showing two orientations of a magnetic element according to embodiments of the invention.

FIG. 5 illustrates a segmented side or plan view of another embodiment according to the invention. A sensor 50 may include a magnetic element 52 defining a cavity 54 therein. Three magnetic field sensors 56a, 56b, and 56c may be positioned in the cavity 54 at different orientations, for example, 0°, 60°, and 120°. A change of flux incident on the magnetic field sensors 56a, 56b, and 56c as the magnetic element 52 rotates may approximate a sine function. The amount of change of flux per degree of rotation for each magnetic field sensor 56x (with x standing for a, or b, or c) may be greatest and most linear when a magnetic field represented by lines 58 make an angle with each magnetic field sensor 56x of around 45°. And, the amount of change of flux per degree of rotation may be least, and least linear, when the lines 58 of flux make an angle with each magnetic field sensor 56x of around zero and 90° of rotation. In this example embodiment, linear output of the sensor 50 may be better approximated using multiple magnetic sensing elements at different orientations to extend the overall linearity of the output.

Figure 6:
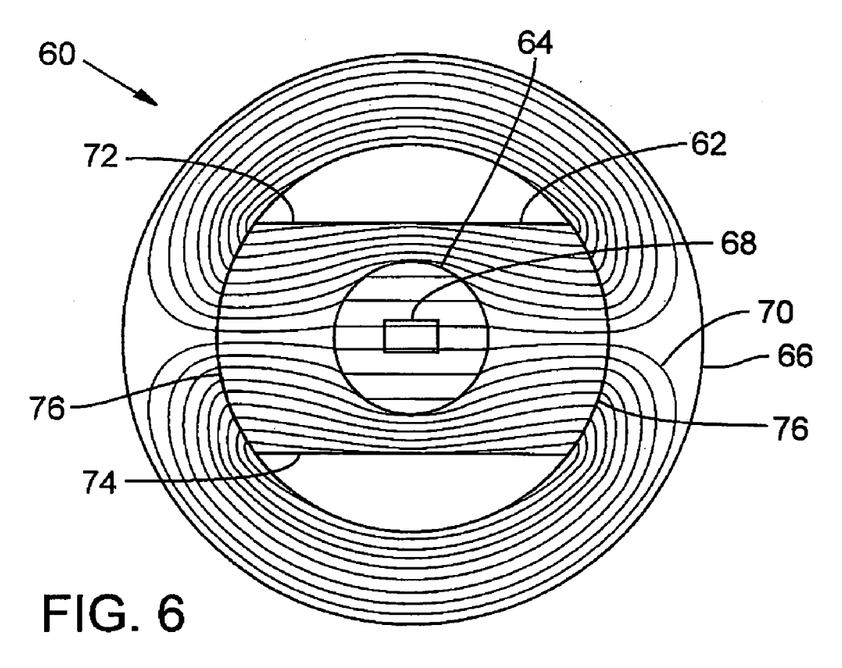
FIG. 6 illustrates a side or plan view according to an embodiment of the invention.

FIG. 6 illustrates a plan view of another embodiment according to the invention. A rotary position sensor 60 may include a magnetic element 62 which may have a cavity 64 therein. A flux-concentrator 66 may be arranged to substantially surround the magnetic element 62. A magnetic field sensor 68 may be located within the cavity 64. Lines 70 represent a magnetic field concentrated by the flux concentrator 66 which may increase the strength of the magnetic field inside the cavity 64. The field may be substantially uniform across the cavity. The magnetic element 62 may include a straight or rectilinear top edge 72 and a straight or rectilinear bottom edge 74 being substantially parallel to one another. The magnetic element may have curvilinear ends 76 shaped to fit within a ring-shaped flux concentrator 66.

In this, or any embodiment, a magnetic element may be a permanent magnet or magnetized in any suitable way. The magnetic field 70 in the cavity 64 of the magnetic element 62 may be as strong as or stronger than the magnetic field in a full circular magnet, and it may use less magnetic material. For example, it has been demonstrated by the inventor that the magnetic element 62 may use 24% less magnetic material, than a full circular magnet, and provide a 4% increased magnetic field strength inside the cavity.

Figure 7:
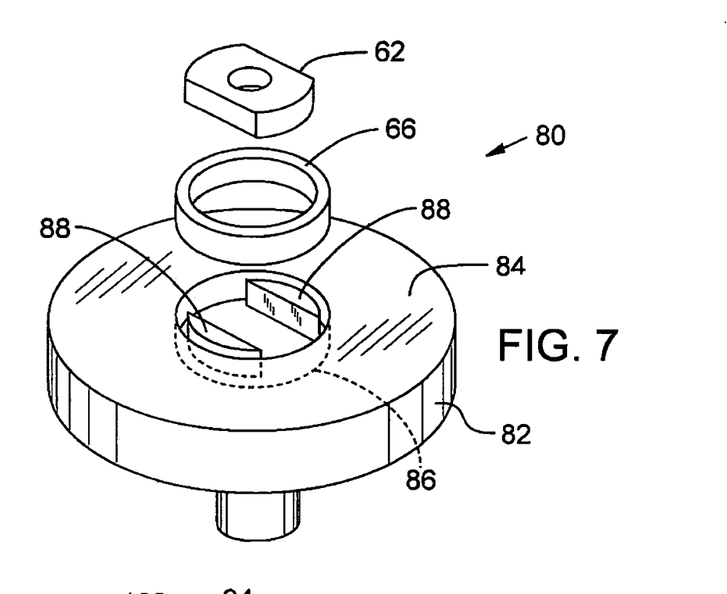
FIG. 7 illustrates a perspective view according to an embodiment of the invention.

FIG. 7 illustrates an exploded isometric view of another embodiment according to the invention. A sensor 80 may include a body 82 arranged to include a receiving face 84 that has been formed or assembled to define a cavity 86 for receiving a flux concentrator 66. The cavity 86 includes lugs 88 arranged to fit within the flux concentrator 66 and arranged to receive a magnetic element 62. The cavity 86 and the lugs 88 may provide positive and secure orientation of the concentrator 66, and the magnetic element 62 within the body 82. The lugs 88 may be formed on the underlying surface, by for example molding or they may be added thereto in other ways including, but not limited to, a snap arrangement, screwed, bolted, or pinned in place.

Figure 8:
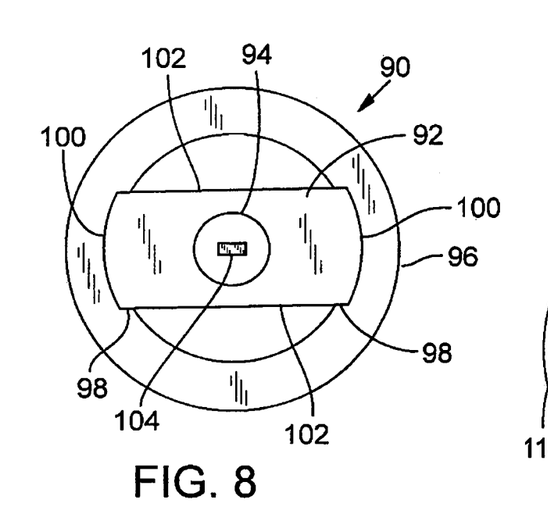
FIG. 8 illustrates a side or plan view according to an embodiment of the invention.

FIG. 8 illustrates side or plan view of a fourth embodiment according to the invention. A rotary position sensor 90 may include a magnetic element 92 which may have a cavity 94 therein. A flux concentrator 96 may be arranged to substantially surround the magnetic element 92. The flux concentrator 96 may include one or more cavities or notches 98 into which may fit ends 100 of the magnetic element which may help assure ease of installation, proper orientation, and a secure fit. The ends 100 may be curvilinear as shown. The top and bottom edges 102 may be rectilinear. One or more magnetic field sensors 104 may be positioned in the cavity 94.

Figure 9:
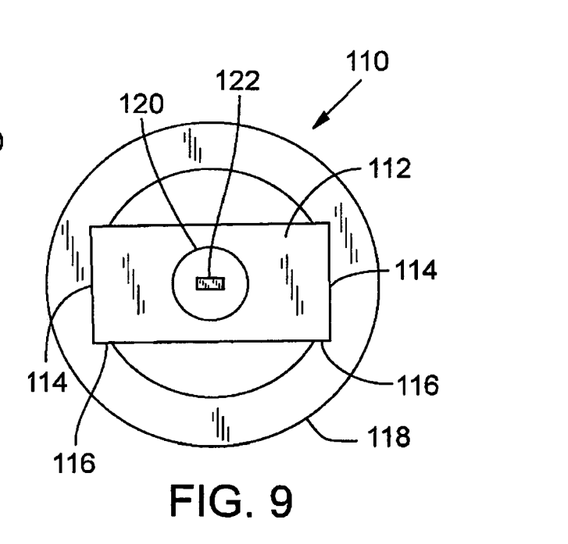
FIG. 9 illustrates a side or plan view according to an embodiment of the invention.

FIG. 9 illustrates side or plan view of a fifth embodiment according to the invention wherein a rotary position sensor 110 includes a magnetic element 112 having a wholly rectilinear shape such as a rectangle or a square. The magnetic element has ends 114 that fit into cavities or notches 116 defined in a flux concentrator 118 that may assure ease of installation, proper orientation, and a secure fit of the magnetic element 112 into the flux concentrator 118. The magnetic flux element 112 may have a cavity 120 therein in which may be positioned one or more magnetic field sensors 122.

Figure 10:
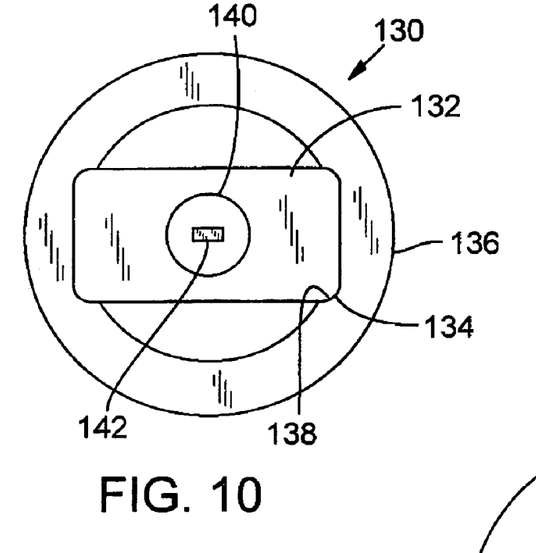
FIG. 10 illustrates a side or plan view according to an embodiment of the invention.

FIG. 10 illustrates a side or plan view of another example embodiment according to the invention wherein a rotary position sensor 130 includes magnetic element 132 which may have a rectilinear shape such as a rectangle or a square with curved or filleted exterior corners 134. A flux concentrator 136 may have similar and corresponding interior corners 138 into which the magnetic element 132 may fit, which may assure ease of installation, proper orientation, and a secure fit of the magnetic element 132 into the flux concentrator 136. The magnetic flux element 132 may have a cavity 140 therein in which may be positioned one or more magnetic field sensors 142.

Figure 11:
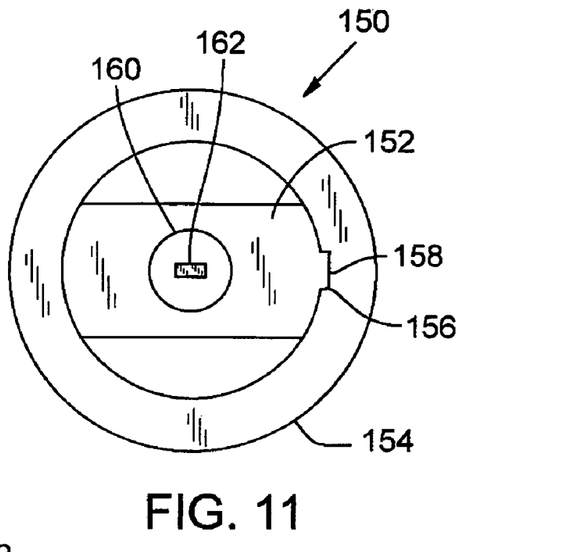
FIG. 11 illustrates a side or plan view according to an embodiment of the invention.

FIG. 11 illustrates side or plan view of another example embodiment according to the invention wherein a rotary position sensor 150 includes a magnetic element 152 which may include a projection 158 which fits into a cavity 156 of the flux concentrator 154. The arrangement may assure ease of installation, proper orientation, and a secure fit of the magnetic element 152 into the flux concentrator 154. The magnetic flux element 152 may have a cavity 160 therein in which may be positioned one or more magnetic field sensors 162.

Figure 12:
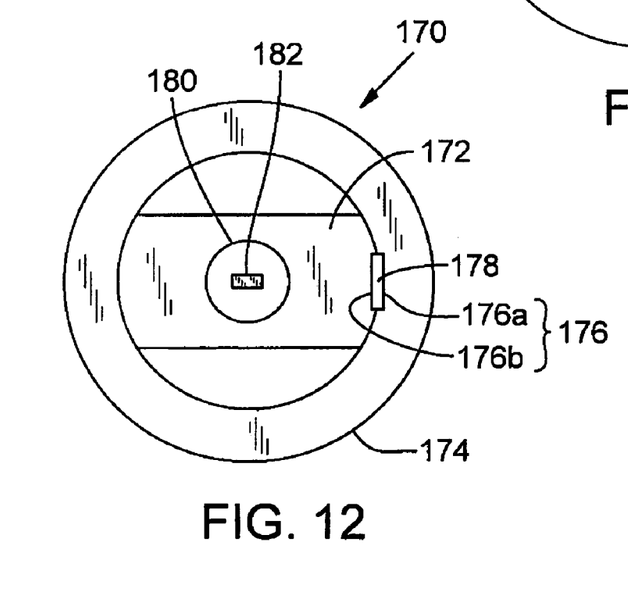
FIG. 12 illustrates a side or plan view according to an embodiment of the invention.

FIG. 12 illustrates a side or plan view of another example embodiment according to the invention wherein a rotary position sensor 170 includes a magnetic element 172 positioned in a flux concentrator 174. Each of the magnetic element 172 and the flux concentrator 174 define portions 176a and 176b of a keyway 176. A key 178 is sized to fit into the keyway 176 that may assure ease of installation, proper orientation, and secure fit of the magnetic element 172 into the flux concentrator 174. The magnetic flux element 172 may have a cavity 180 therein in which may be positioned one or more magnetic field sensors 182.

Figure 13:
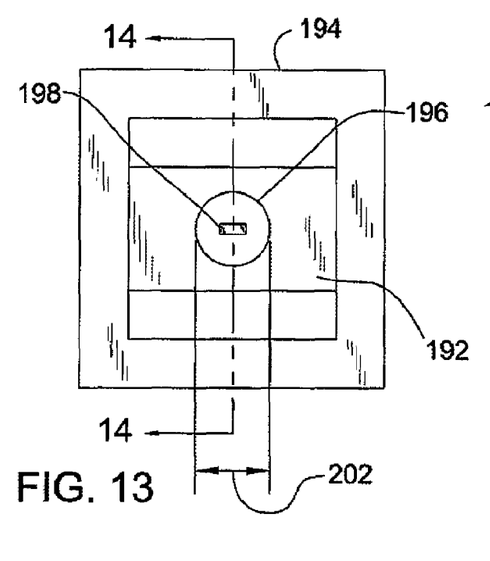
FIG. 13 illustrates a side or plan view according to an embodiment of the invention.

FIG. 13 illustrates a side or plan view of another example embodiment according to the invention, wherein a rotary position sensor 190 includes a rectilinear magnetic element 192 which may be positioned in a rectilinear flux concentrator 194. The magnetic element 192 may have a cavity 196 therein. A magnetic field sensor 198 may be positioned in the cavity 196. It may be realized that elements of any other embodiment may be combined with elements of this embodiment or any other including but not limited to elements to assure proper orientation and a secure fit and having multiple magnetic sensing elements.

Figure 14:
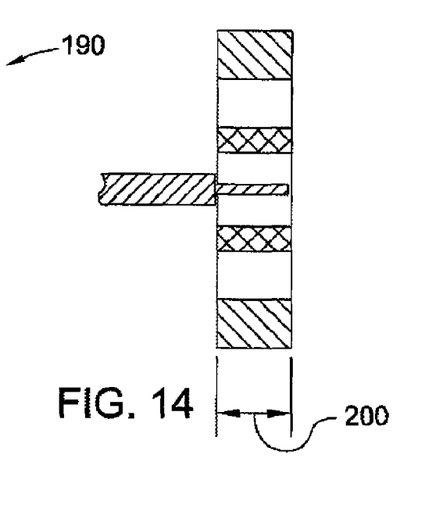
FIG. 14 is a cross-sectional view taken at the line 14-14 in FIG. 13.

FIG. 14 is a cross-sectional view taken at the line 14-14 in FIG. 13. In this embodiment a thickness 200 may be about equal to or greater than the diameter 202 (shown in FIG. 13) of the cavity. Such a relationship may achieve optimal performance and minimal sensitivity to axial positioning errors.

Figures 15, 16:
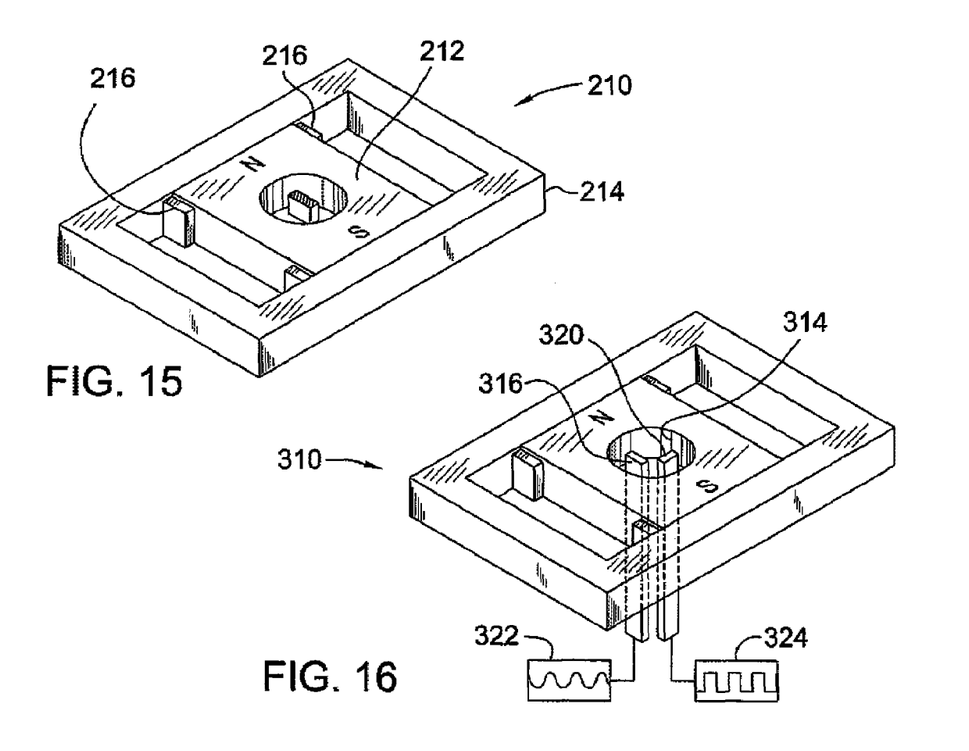
FIGS. 15 and 16 are isometric views, with portions of FIG. 16 shown schematically of various embodiments according to the invention.

FIG. 15 is an isometric view of another example embodiment according to the invention. A sensor 210 includes a rectangular magnetic element 212 positioned, within a rectangular flux concentrator 214. Detents 216 may be located such that the magnetic element 212 can be positively located within the flux concentrator 214. The detents 216 may be formed on the underlying surface, by for example molding or they may be added thereto by way including, but not limited to, a snap arrangement or screwed, bolted, or pinned in place. Detents of similar construction may be used to hold the flux concentrator 214 in place and to positively locate it.

FIG. 16 is a partial isometric view, and partial schematic view of another example embodiment according to the invention. A position sensor 310 may include a first magnetic field sensor 316 and a second magnetic field sensor 320 each positioned in a cavity 314. The first magnetic field sensor 316 may be configured to output an analog value as illustrated with block 322, and the second magnetic field sensor 320 may be configured to output a binary signal as illustrated with block 324.

While the various embodiments illustrated have shown magnetic sensing elements of differing numbers, shapes, sizes and orientations, and magnetic elements and flux concentrators of various shapes, sizes and orientations, embodiments of the present invention are not so limited. Embodiments may include any number of sensors as may be practical depending on size of the magnetic element, size of the cavity therein, strength of the magnetic field, sensitivity of the magnetic field sensor, and depending on how the sensor may be used. Various applications may include, but are not limited to, dual Accelerator Position Switch (APS)/Idle Validation Switch (IVS) sensors wherein two independent sensor elements are used. Embodiments may also include one or more magnetic field sensors configured to verify a signal from one or more of another of the magnetic field sensors.

Embodiments of the invention have been found to be less sensitive to static and dynamic misalignment, such as a wobble, of a magnetic field sensor relative to a magnetic element, and vice versa. Embodiments may also allow looser design tolerances and less expensive parts such as, but not limited to, bearings bushings, and mating surfaces. Some embodiments ensure proper and secure alignment. Some embodiments are effective with less magnetic material. Some embodiments may be used with more than one magnetic field sensor.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A position sensor comprising:
    a magnetic element having opposed exterior rectilinear edges and having a cavity disposed therein;
    a flux concentrator at least partially disposed about a periphery of the magnetic element;
    a magnetic field sensor positioned within the cavity, the magnetic element and the magnetic field sensor being disposed to move relative one another;
    a body having a receiving face formed to define a hollow arranged to receive the flux concentrator, the hollow having an inside edge; and
    lugs in the hollow spaced from the inside edge, the flux concentrator disposed between the lugs and the inside edge and the magnetic element disposed between the lugs.

2. A position sensor comprising:
    a magnetic element having opposed exterior rectilinear edges and having a cavity disposed therein;
    a flux concentrator at least partially disposed about a periphery of the magnetic element;
    a magnetic field sensor positioned within the cavity, the magnetic element and the magnetic field sensor being disposed to move relative one another; and
    multiple magnetic field sensors within the cavity wherein one of the multiple magnetic field sensors is configured to output a first signal, and another of the multiple magnetic field sensors is configured to verify the first signal based on a value detected from the another of the multiple magnetic field sensors.

3. A position sensor comprising:
    a magnetic element having opposed exterior rectilinear edges and having a cavity disposed therein;
    a flux concentrator at least partially disposed about a periphery of the magnetic element; and
    a magnetic field sensor positioned within the cavity, the magnetic element and the magnetic field sensor being disposed to move relative one another, wherein the magnetic field sensor is a first magnetic field sensor being configured to output an analog value; and a second magnetic field sensor positioned in the cavity and configured to output a binary signal.

4. The position sensor of claim 3 wherein the magnetic element is rectangular and the flux concentrator is rectangular.

5. A position sensor comprising:
    a magnetic element having opposed exterior substantially rectilinear top and bottom edges and curvilinear ends and having a cavity disposed therein;
    a flux concentrator at least partially disposed about a periphery of the magnetic element;
    a magnetic field sensor positioned within the cavity, the magnetic element and the magnetic field sensor being disposed to move relative one another; and
    wherein the magnetic element including substantially rectilinear top and bottom edges and curvilinear ends.

6. The position sensor of claim 5 further comprising multiple magnetic field sensors within the cavity.

7. The position sensor of claim 6 wherein the multiple magnetic field sensors are each at different orientations with respect to one another.

8. The position sensor of claim 5 wherein the curvilinear ends are actuate and the flux concentrator is ring shaped and coaxial to the curvilinear ends, and the flux concentrator is at least in partial contact with the curvilinear ends.

9. The position sensor of claim 8 wherein the flux concentrator has an internal surface arranged to include at least one notch, the magnetic element having a portion extending into the at least one notch.

10. The position sensor of claim 5 wherein the flux concentrator is ring shaped.

11. The position sensor of claim 5 wherein the flux concentrator makes contact with at least a portion of the periphery of the magnetic element.

12. The position sensor of claim 5 wherein the magnetic element is a permanent magnet.

13. The position sensor of claim 5 wherein at least one rectilinear edge is substantially parallel with lines of flux of the magnetic element.

14. A position sensor comprising:
    a magnetic element having opposed exterior rectilinear edges and having a cavity disposed therein;
    a flux concentrator at least partially disposed about a periphery of the magnetic element;
    a magnetic field sensor positioned within the cavity, the magnetic element and the magnetic field sensor being disposed to move relative one another; and
    wherein the flux concentrator has an internal surface arranged to include two notches, the magnetic element having two ends each arranged to fit into a respective one of the two notches.

15. A position sensor comprising:
    a magnetic element having opposed exterior rectilinear edges and having a cavity disposed therein;
    a flux concentrator at least partially disposed about a periphery of the magnetic element;
    a magnetic field sensor positioned within the cavity, the magnetic element and the magnetic field sensor being disposed to move relative one another; and
    wherein the magnetic element defines a first portion of a keyway and the flux concentrator defines a second portion of a keyway; the first portion of the keyway and the second portion of the keyway defining a keyway; and further comprising a key positionable in the keyway.

16. A position sensor comprising:
    a magnetic element having opposed exterior rectilinear edges and having a cavity disposed therein;
    a flux concentrator at least partially disposed about a periphery of the magnetic element;
    a magnetic field sensor positioned within the cavity, the magnetic element and the magnetic field sensor being disposed to move relative one another; and
    wherein the cavity has a diameter, the magnetic element has a thickness, the thickness being substantially the same or greater than the diameter.

17. A position sensor comprising:
    a magnetic element having opposed rectilinear edges and having a cavity disposed therein;
    a flux concentrator at least partially disposed about a periphery of the magnetic element;

a magnetic field sensor positioned within the cavity;

a body having a receiving face formed to define a hollow arranged to receive the flux concentrator the hollow having an inside edge; and lugs in the hollow spaced from the inside edge, the flux concentrator disposed between the lugs and the inside edge and the magnetic element disposed between the lugs.

18. A rotary position sensor comprising:

a magnetic element with two or more rectilinear edges and having a cavity disposed therein; and one or more magnetic field sensors positioned in the cavity, the magnetic element and the magnetic field sensor being movable relative one another, wherein the one or more magnetic field sensors are plural magnetic field sensors and at least one of the plural magnetic field sensors is configured to verify a signal from another of the plural magnetic field sensors.

19. The rotary position sensor of claim 18 further comprising a flux concentrator substantially surrounding the magnetic element.

20. The rotary position sensor of claim 18 wherein the one or more magnetic field sensors are plural magnetic field sensors oriented differently from one another with respect to the cavity.

21. The rotary position sensor of claim 18 wherein one magnetic field sensor positioned in the cavity is off-center.

22. A rotary position sensor comprising:

a magnetic element with two or more rectilinear edges and having a cavity disposed therein; and one or more magnetic field sensors positioned in the cavity, the magnetic element and the magnetic field sensor being movable relative one another, wherein the one or more magnetic field sensors are plural magnetic field sensors and at least one of the plural magnetic field sensors is configured to output an analog signal and another of the plural magnetic field sensors is configured to output a digital signal.

* * * * *